United States Patent

Ohara

[11] Patent Number: 6,014,716
[45] Date of Patent: Jan. 11, 2000

[54] SYSTEM FOR RECOGNIZING BIDIRECTIONAL COMMUNICATION OVER PARRALLEL DATA LINES BY FURTHER SENDING DATA TRANSMISSION REQUEST AND NOTIFICATION INDICATING REVERSE DIRECTION TRANSMISSION IS POSSIBLE TO SECOND DEVICE

[75] Inventor: Kiyotaka Ohara, Nagoya, Japan

[73] Assignee: Brother Kogyo Kabushiki Kaisha, Nagoya, Japan

[21] Appl. No.: 08/884,474

[22] Filed: Jun. 27, 1997

[30] Foreign Application Priority Data

Jul. 1, 1996 [JP] Japan .................................. 8-171302

[51] Int. Cl.[7] .......................... G06F 13/10; G06F 13/38; G06F 3/12
[52] U.S. Cl. .................................. 710/14; 710/8; 710/12; 710/31
[58] Field of Search ........................ 395/182.16, 185.05, 395/821, 115, 114, 200, 239.9, 241.9, 280, 884; 600/508; 400/708, 64; 371/37.6, 37.7, 53; 711/172; 364/927.8; 710/8, 12, 14, 31

[56] References Cited

U.S. PATENT DOCUMENTS

| | | | |
|---|---|---|---|
| 4,242,750 | 12/1980 | Finck ..................................... | 371/20.5 |
| 4,281,380 | 7/1981 | DeMesa ................................. | 395/299 |
| 4,592,011 | 5/1986 | Mantellina ............................. | 711/172 |
| 4,720,813 | 1/1988 | Kaneko .................................. | 395/836 |
| 4,920,882 | 5/1990 | Hoyt ....................................... | 400/708 |
| 5,185,853 | 2/1993 | Cheng .................................... | 395/115 |
| 5,299,314 | 3/1994 | Gates ..................................... | 395/884 |
| 5,402,795 | 4/1995 | Reichl ................................... | 600/508 |
| 5,479,922 | 1/1996 | Reichl ................................... | 600/300 |
| 5,506,958 | 4/1996 | Myran ................................ | 395/182.16 |
| 5,793,988 | 8/1998 | Asano ................................... | 395/280 |

FOREIGN PATENT DOCUMENTS

| | | |
|---|---|---|
| A2 0 -212335 | 3/1987 | European Pat. Off. . |
| 60-157353 | 8/1985 | Japan . |
| B2 7-36145 | 4/1995 | Japan . |

Primary Examiner—Thomas C. Lee
Assistant Examiner—Ilwoo Park
Attorney, Agent, or Firm—Oliff & Berridge, PLC

[57] ABSTRACT

A bidirectional communication method, bidirectional communication device and storage medium for automatically setting the communication mode without complications to the user and not causing the malfunctioning of the computer system and the printer are disclosed. The control register of the personal computer is used to set data reception from the laser printer in a byte mode. A specific data is written to the data register, and the value of the data register is read. If the value of the data register is not the specific data, it is recognized that the personal computer can be set to the byte mode. If, on the other hand, the read value of the data register is the specific data, another specific data is written to the data register, then the value of the data register is read, and if the value of the data register is another specific data, it is recognized that the personal computer cannot be set to the byte mode.

31 Claims, 7 Drawing Sheets

DATA REGISTER (DR)

FIG. 4(b)

CONTROL REGISTER (CR)

FIG. 4(c)

STATUS REGISTER (SR)

FIG. 7

SYSTEM FOR RECOGNIZING BIDIRECTIONAL COMMUNICATION OVER PARRALLEL DATA LINES BY FURTHER SENDING DATA TRANSMISSION REQUEST AND NOTIFICATION INDICATING REVERSE DIRECTION TRANSMISSION IS POSSIBLE TO SECOND DEVICE

BACKGROUND OF THE INVENTION

The present invention relates to a bidirectional communication recognition device, a bidirectional communication recognition method and a storage medium for implementing a bidirectional communication recognition method in a communications system between a first device, such as a computer system, etc., and a second device, such as a printer, etc.

The IEEE (Institute of Electrical and Electronics Engineers) 1284 standard is known as a parallel interface standard for transmitting data and commands from a computer system, such as a personal computer, etc., to a printer.

This standard does not only apply to simply sending data and commands from a computer system, but providing functions for transmitting detailed status data about the state of the printer from the printer side to the computer side, it enables bidirectional communication between computer system and printer.

The byte mode and the nibble mode are two methods for implementing the function of transmitting printer status data to the computer system side.

The byte mode is a method for transmitting status data from the printer to the computer system making use of 8 parallel data lines which are normally used for transmitting data and commands from the computer system to the printer.

The nibble mode is a method for transmitting status data from the printer to the computer system which, instead of using the parallel data lines, uses 4 of the control lines (e.g. "BUSY", "ACK", "PE" and "SLCT") by sending 1 byte of data divided into 4 low-order bits and 4 high-order bits in two data transfer cycles.

With the nibble mode there is the disadvantage that, because 1 byte of data is divided in 2 data transfer cycles, the transfer speed is low Therefore, from the point of view of the processing speed and the operational efficiency of a computer system or a printer it is more advantageous to use the byte mode than the nibble mode for implementing the transmission of status data.

However, there are computer systems and printers which are not provided with the byte mode function. Consequently, for the sake of performing as efficient and fast a printing process as possible, the user, having verified the functions of the computer system and the printer, has to set the byte mode, before the printing process can take place, in the case that both the computer system and the printer support the byte mode, or has to set the nibble mode, for the printing process to take place, in the case where either the computer system or the printer, or both, do not support the byte mode.

Thus verifying the functions is troublesome and complicated for the user.

Therefore, a process, on the computer system side, for automatically recognizing the function of the computer system and of the printer and for setting the appropriate mode in accordance with the result of the process has been devised.

With this automatic recognition, the computer system and the printer are first set to the byte mode by a program run on the computer system, next the computer system requests the transfer of the ID and the status data from the printer over the parallel data lines.

If in response to this request, the correct data are transmitted from the printer to the computer system, it is recognized that the computer system and the printer can use the byte mode, after which bidirectional transmission in the byte mode can take place. On the other hand, if incorrect data are transmitted, because either the computer system or the printer or both do not have the byte mode function, or because of a functional problem with a switchbox or other device connected to the cable between the computer system and the printer, it can be determined that only unidirectional transmission from the computer system to the printer is possible; and since the byte mode is not possible, bidirectional transmission is thereafter implemented with the nibble mode being used for transmitting data from the printer.

However, if only the printer has the byte mode function and not the computer system, and the above-described automatic recognition takes place, there is the danger of the following problem occurring.

Namely, at the time of the automatic recognition mentioned before, first of all, a command requesting data transmission in byte mode is transmitted from the computer system over the parallel data line to the printer, by a program run on the computer system. This, being a normal transmission from the computer system to the printer, takes place without problem.

However, after that, because the ID and other data from the printer side are transmitted from the parallel data line to the computer system side, the program at the computer system side sets the computer system itself so as to receive data in the byte mode. However, since in reality the computer system does not have the byte mode function, it remains in the transmitting state.

In consequence, the computer system ends up receiving the transmitted output from the printer side while remaining in the transmitting state.

If such a transmission takes place, it has to be feared that, in the worst case, the interface of the computer system or of the printer will malfunction.

SUMMARY OF THE INVENTION

It is the object of the present invention to solve the complications involved in the setting of the transmission mode by the user by implementing automatic bidirectional communication, which will not create the above-mentioned problems, and which will not cause the malfunctioning of the computer system or of the printer.

The bidirectional communication recognition method sent in the first device in a communication system on the premise of forward direction communication for transmitting data from a first device to a second device over parallel data lines of a parallel interface, comprising following steps:

data line reverse direction transmission for transmitting data from the second device to the first device over the parallel data lines is set at the first device, then, specific data is written to a data register, provided at the first device, which outputs data, written during forward direction transmission, as parallel signals to the parallel data lines, next, the contents of the data register is read, and the written specific data is compared with the read contents; and wherein, if the two values are different, it is recognized that bidirectional communication of the first device and the second device over the parallel data lines is possible, and if the two are identical, it is recognized that bidirectional communication is not possible. This recognition method is preferably implemented within the first device.

If both the first device and the second device have the byte mode function, and if transmission in reverse direction from the second device to the first device over the same parallel data lines is possible, and if transmission at the first device has been set to the reverse direction, i.e. to reception for the first device, the interface of the first device is switched to the receiving state. Consequently, even if specific data has been written to the data register, it is not possible to change to the desired contents at the first device because the contents of this data register is anchored to a specific value, e.g. "FFH" (where H is a hexadecimal number) caused by a voltage pull-up, since the interface of the first device is in the reception preparation state. Which means that, in reality, the contents which is supposed to have been written to the data register of the first device is not written at all.

Further, in the case where the second device has the byte mode function, but the first device does not, even if the reverse direction transmission, i.e. reception, has been set at the first device, in reality it remains in the transmitting state. For this reason, when writing specific data to the data register, this specific data is maintained as it is written, for transmission, until it is transmitted, and is not anchored to a specific value like in the receiving state. Moreover, since the first device has not requested the transmission of an ID or other data from the second device, the problem of a malfunctioning at the interface of the first device, which is in the transmitting state, due to the start of transmission by the second device, does not occur.

Consequently, at the first device, the specific data written to the data register and the read contents is compared, and if the two are different, it is recognized that at least the computer system side is capable of bidirectional communication over the same parallel data lines. If it has been determined beforehand that the printer has the byte mode function, bidirectional communication between the computer system and the printer is possible, and the bidirectional communication process can start immediately.

If the specific data written to the data register and the read contents are identical, it is recognized that bidirectional communication over the same parallel data lines is not possible. And yet, there is no danger that the automatic recognition will cause malfunction to the computer system or to the printer.

Further, it is possible to imagine a case in which the contents written to the data register in the first device coincides by chance with the above-mentioned specific value of the receiving state of the first device; however, such a situation can normally be prevented by writing a contents to the data register of the first device, which cannot be set as the specific value mentioned before.

Apart from this, at the first device, the contents of the written specific data is constantly changed until it is determined that the specific data written to the data register and the read contents (called "the two values" or the "said values" below) are different, the writing and reading of the specific data being performed repeatedly a specified number of times as upper limit; if it is determined that the two values are different, it is recognized that bidirectional communication is possible; but if, even after the writing of the specific data and the reading of the contents of the data register has been repeated a specified number of times, it has not been determined that the two values are different, it can be recognized that bidirectional communication is not possible. Further, as said specified number of times, it is normally sufficient at two times.

And further, if it is unclear whether the printer side has the byte mode function when, as described above, it is determined that the two values are different, it is not immediately recognized that bidirectional communication is possible, but a notification to the effect that data line reverse direction transmission is possible is sent from the first device to the second device, and if, in response to this notification, a signal to the effect that data line reverse direction transmission is not possible, is not returned from the second device over the control lines of the parallel interface to the first device, it is recognized that bidirectional communication is possible; but if, in response to this notification, a signal to the effect that data line reverse direction transmission is not possible is returned from the second device over the control lines of the parallel interface to the first device, it can be recognized that bidirectional communication is not possible.

Which means that, if there is at the second device a notification of a declarative statement, etc., with the contents signifying that bidirectional communication is possible or that bidirectional communication is to take place, etc., originating from the first device, a signal to the effect that data line reverse direction transmission is not possible is output over the control lines to the first device. Consequently, if such a signal is output, it is recognized that bidirectional communication is not possible, since it is certain that bidirectional communication is not possible; but if the signal is not output, it is recognized that bidirectional communication is possible.

Furthermore, when it has been determined, by comparison, that the two values are different, and if, after a data transmission request and a notification to the effect that data line reverse direction transmission is possible have been sent from the first device to the second device, the data returned from the second device by data line reverse direction transmission, in response to this data transmission request, is correct, it is recognized that bidirectional communication is possible; but if the returned data is not correct (including the case of no data being returned), it can be recognized that bidirectional communication is not possible.

In other words, if the second device supports the before-mentioned data line reverse direction transmission, and if there is a data transmission request, after the notification of a declarative statement, etc., with the contents signifying that bidirectional communication is possible or that bidirectional communication is to take place, etc., originating from the first device, the ID and other data of the second device are transmitted over the same parallel data lines to the side of the first device by data line reverse direction transmission.

Consequently, the data which is returned by data line reverse direction transmission from the second device in response to the data transmission request is received at the first device, and if its contents is correct, then it is recognized that bidirectional communication is possible; but if its contents is not correct, it can be recognized that bidirectional communication is not possible.

Since the returned data is normally assembled in a specific format, it is possible to determine whether the above-mentioned returned data is correct or not by deciding whether or not the data corresponds to this format. Further, even if the second device is capable of transmitting by means of the before-mentioned data line reverse direction transmission, it is still possible that the contents of the returned data is not correct if a switchbox or other device, inserted in the line connecting the computer system to the printer, does not support the data line reverse direction transmission mentioned before; in this case, it is recognized that bidirectional communication is not possible, even though both the computer system and the printer support the before-mentioned data line reverse direction transmission.

Furthermore, by combining the 2 above-mentioned methods, it is possible to make a determination with a higher degree of accuracy. That is to say, when it is determined by comparison that the two values are different, the notification to the effect that data line reverse direction transmission is possible and a data transmission request are sent from the first device to the second device; if, in response to this notification, a signal to the effect that data line reverse direction transmission is not possible is not returned from the second device over the control lines to the first device, and if the data returned by data line reverse direction transmission from the second device, in response to the data transmission request, is correct, it is recognized that bidirectional communication is possible; but if, in response to the before-mentioned notification, a signal to the effect that data line reverse direction transmission is not possible is returned from the second device over the control lines to the first device, or if the data returned by data line reverse direction transmission from the second device, in response to the before-mentioned data transmission request, is not correct, it can be recognized that bidirectional communication is not possible. Thus recognition of whether or not bidirectional communication is possible takes place with a still higher degree of reliability.

Further, if it has been recognized that bidirectional communication is not possible, it can simply be recognized that parallel reverse direction transmission of data from the second device to the first device is not possible; however, it can also be recognized that only control line reverse direction transmission using a plurality of control lines in parallel is possible. Which means that bidirectional transmission over parallel data lines is not possible; however, by transmitting data from the first device to the second device over parallel data lines, and by transmitting data in parallel from the second device to the first device by using a plurality of control lines, it is possible to implement bidirectional communication with a different method.

Therefore, if it is recognized that bidirectional communication is possible, the first device is set to perform bidirectional communication; if it is recognized that bidirectional communication is not possible, the first device can be set to perform bidirectional communication comprising forward direction communication and control line reverse direction transmission using a plurality of control lines in parallel.

Furthermore, if it is recognized that bidirectional communication is not possible, it is not immediately recognized that control line reverse direction transmission is possible, nor is the first device set to control line reverse direction transmission; when it is determined that bidirectional communication is not possible, a notification to the effect that control line reverse direction transmission is possible is sent from the first device to the second device, and if, in response to this notification, a signal to the effect that control line reverse direction transmission is not possible is not returned from the second device to the first device over the control lines of the parallel interface, it is recognized that control line reverse direction transmission is possible; but if, in response to this notification, a signal to the effect that control line reverse direction transmission is not possible is returned from the second device to the first device over the control lines, it can be recognized that control line reverse direction transmission is not possible.

Also, when performing such a control line reverse direction transmission, it is confirmed whether or not the second device is capable of the control line reverse direction transmission before control line reverse direction transmission takes place, therefore, reliable communication processing is possible.

Furthermore, the following methods can be used to confirm with certainty whether or not control line reverse direction transmission is possible. That is to say, when it is determined that bidirectional communication is not possible, a notification to the effect that control line reverse direction transmission using a plurality of control lines in parallel is possible and a data transmission request are further sent from the first device to the second device; if the data returned, in response to this data transmission request, from the second device by control line reverse direction transmission is correct, it is recognized that control line reverse direction transmission is possible; but if the returned data mentioned before is not correct, it can be recognized that the before-mentioned control line reverse direction transmission is not possible.

Moreover, when it is determined that bidirectional communication is not possible, a notification to the effect that control line reverse direction transmission is possible and a data transmission request are further sent from the first device to the second device; if, in response to this notification, a signal to the effect that control line reverse direction transmission is not possible is not returned from the second device to the first device over the control lines, and if the data returned, in response to the data transmission request, from the second device by control line reverse direction transmission is correct, it is recognized that control line reverse direction transmission is possible; but if, in response to the before-mentioned notification, a signal to the effect that control line reverse direction transmission is not possible is returned from the second device to the first device over the control lines, or if the data returned, in response to the data transmission request, from the second device by control line reverse direction transmission is not correct, it can be recognized that control line reverse direction transmission is not possible.

This is to address the case, as mentioned before, in which the contents of the returned data is not correct if a switchbox or other device, inserted in the line connecting the computer system with the printer, does not support the control line reverse direction transmission.

Consequently, if it is recognized that control line reverse direction transmission is not possible, it can be recognized that parallel reverse direction transmission of data from the second device to the first device is not possible.

But if it is recognized that control line reverse direction transmission is possible, the first device can be set to perform control line reverse direction transmission, that is to say, it can be set to enable bidirectional communication comprising control line reverse direction transmission and forward direction transmission transmitting data over parallel data lines; moreover, if it is recognized that control line reverse direction transmission is not possible, it can be set to perform neither bidirectional communication nor control line reverse direction transmission.

If the above-mentioned bidirectional communication recognition method is implemented as a device, for example, a constitution such as the one described below can be adopted.

That is to say, it can be configured as a bidirectional communication recognition device comprising a reverse direction transmission setting means setting the data line reverse direction transmission for transmitting data from the second device to the first device over the parallel data lines, a data register write/read means writing specific data to the data register and then reading the contents of the data register, after data line reverse direction transmission has been set by the reverse direction transmission setting means, a comparing means comparing the two values of the specific data written by the data register write/read means with the contents read by the same means and determining whether or not the two values are identical, and a recognition means recognizing that bidirectional communication over the parallel data lines between the first device and the second device is possible, if the comparing means determines that the two values are different, and recognizing that bidirectional communication over the parallel data lines between the first device and the second device is not possible, if the comparing means determines that the two values are identical.

Wherein, the comparing means causes the data register write/read means to repeat a specified number of times, changing the content of the specific data, as upper limit, the writing of the specific data and the reading of the contents of the data register, and the recognition means recognizes that bidirectional communication is possible if the comparing means determines that the two values mentioned before are different, or that bidirectional communication is not possible if the comparing means cannot determine that the two values are different even after the data register write/read means has repeated the writing of the specific data and the reading of the contents of the data register a specified number of times.

While further comprising a notifying means sending a notification to the effect that data line reverse direction transmission is possible from the first device to the second device when it has been determined by the comparing means that the two values mentioned before are different, and a reply detecting means detecting whether or not, in response to the notification of this notifying means, a signal to the effect that data line reverse direction transmission is not possible has been returned from the second device over the control lines of the parallel interface, the recognition means recognizes that bidirectional communication is possible, if a reply to the effect that data line reverse direction transmission is not possible has not been detected by the reply detecting means, when it has been determined by the comparing means that the two values mentioned before are different; but if a reply to the effect that data line reverse direction transmission is not possible has been detected by the reply detecting means, it recognizes that bidirectional communication is not possible.

While further comprising a data transmission request means sending a notification to the effect that data line reverse direction transmission is possible and a data transmission request from the first device to the second device when it has been determined by the comparing means that the two values mentioned before are different, and a data status detecting means detecting whether or not the data returned, in response to this data transmission request by the data transmission request means, from the second device by data line reverse direction transmission is correct, the recognition means recognizes that bidirectional communication is possible, if it is detected by the data status detecting means that the data returned by data line reverse direction transmission is correct, when it has been determined by the comparing means that the two values mentioned before are different, but if it is detected that the data returned is not correct, it recognizes that bidirectional communication is not possible.

While further comprising a data transmission request means sending a notification to the effect that data line reverse direction transmission is possible and a data transmission request from the first device to the second device when it has been determined by the comparing means that the two values mentioned before are different, a reply detecting means detecting whether or not, in response to the notification of this data transmission request means, a signal to the effect that data line reverse direction transmission is not possible has been returned from the second device over the control lines, and a data status detecting means detecting whether or not the data returned, in response to the data transmission request by the data transmission request means, from the second device by data line reverse direction transmission is correct, the recognition means recognizes that bidirectional communication is possible, if a reply to the effect that data line reverse direction transmission is not possible has not been detected by the reply detecting means, and if it is detected by the data status detecting means that the data returned by data line reverse direction transmission is correct, when it has been determined by the comparing means that the two values mentioned before are different; but if a reply to the effect that data line reverse direction transmission is not possible has been detected by the reply detecting means, or if it is detected by the data status detecting means that the data returned by data line reverse direction transmission is not correct, it recognizes that bidirectional communication is not possible.

Moreover, if the recognition means has recognized that bidirectional communication is not possible, it can be recognized that for parallel reverse direction transmission of data from the second device to the first device only control line reverse direction transmission using a plurality of control lines in parallel is possible.

Moreover, if it has been recognized by the recognition means that bidirectional communication is possible, the first device is set to perform bidirectional communication; but if it has been recognized that bidirectional communication is not possible, the first device can be set to perform bidirectional communication comprising forward direction communication and control line reverse direction transmission using a plurality of control lines in parallel.

The bidirectional communication recognition device can further comprise a second notifying means sending a notification to the effect that control line reverse direction transmission is possible from the first device to the second device when it has been recognized by the recognition means that the before-mentioned bidirectional communication is not possible, a second reply detecting means detecting whether or not, in response to the notification of this second notifying means, a signal to the effect that control line reverse direction transmission is not possible has been returned from the second device over the control lines of the parallel interface, and a second recognition means recognizing that control line reverse direction transmission is possible, if a reply to the effect that control line reverse direction transmission is not possible has not been detected by the second reply detecting means, and recognizing that control line reverse direction transmission is not possible, if a reply to the effect that control line reverse direction transmission is not possible has been detected by the second reply detecting means, when it has been recognized by the recognition means that bidirectional communication is not possible.

The bidirectional communication recognition device can further comprise a second data transmission request means sending a notification to the effect that control line reverse direction transmission is possible and a data transmission request from the first device to the second device when it has been recognized by the recognition means that bidirectional communication is not possible, a second data status detecting means detecting whether or not the data returned, in response to this data transmission request by the second data transmission request means, from the second device by control line reverse direction transmission is correct, and a second recognition means recognizing that control line reverse direction transmission is possible, if it is detected by the second data status detecting means that the data returned by control line reverse direction transmission is correct, or that control line reverse direction transmission is not possible, if it is detected that the before-mentioned returned data is not correct, when it has been recognized by the recognition means that bidirectional communication is not possible.

The bidirectional communication recognition device can further comprise a second data transmission request means sending a notification to the effect that control line reverse direction transmission is possible and a data transmission request from the first device to the second device when it has been recognized by the recognition means that bidirectional communication is not possible, a second reply detecting means detecting whether or not, in response to the notification of this second data transmission request means, a signal to the effect that control line reverse direction transmission is not possible has been returned from the second device over the control lines, a second data status detecting means detecting whether or not the data returned, in response to the data transmission request by the second data transmission request means, from the second device by control line reverse direction transmission is correct, and a second recognition means recognizing that control line reverse direction transmission is possible, if a reply to the effect that control line reverse direction transmission is not possible has not been detected by the second reply detecting means, and if it is detected by the second data status detecting means that the data returned by control line reverse direction transmission is correct, when it has been recognized by the recognition means that the before-mentioned bidirectional communication is not possible, or recognizing that control line reverse direction transmission is not possible, if a reply to the effect that control line reverse direction transmission is not possible has been detected by the second reply detecting means, or if it is detected by the second data status detecting means that the data returned by control line reverse direction transmission is not correct.

Consequently, if the second recognition means has recognized that control line reverse direction transmission is not possible, it can be recognized that the parallel reverse direction transmission of data from the second device to the first device is not possible.

Moreover, if the second recognition means has recognized that control line reverse direction transmission is possible, the first device is set to perform control line reverse direction transmission; but if it has recognized that control line reverse direction transmission is not possible, it is set to perform neither bidirectional communication nor control line reverse direction transmission, which means that it can be set to unidirectional transmission.

As an example of the first device a computer system has been mentioned, and as an example of the second device a printer has been mentioned.

Further, if a computer system constitutes the first device, the before-described bidirectional communication recognition method can be implemented as software and can be used most advantageously when the executable program of the software, stored on floppy disks, a magneto-optic disk, a CD-ROM, or other storage media, is installed to the hard disk or other storage medium of the computer system or loaded to the memory of the computer system. Or else it can also be installed or loaded to the computer system by network communication.

DETAILED DESCRIPTION OF THE PREFERRED EMBODIMENT

EXAMPLE 1

Figure 1:
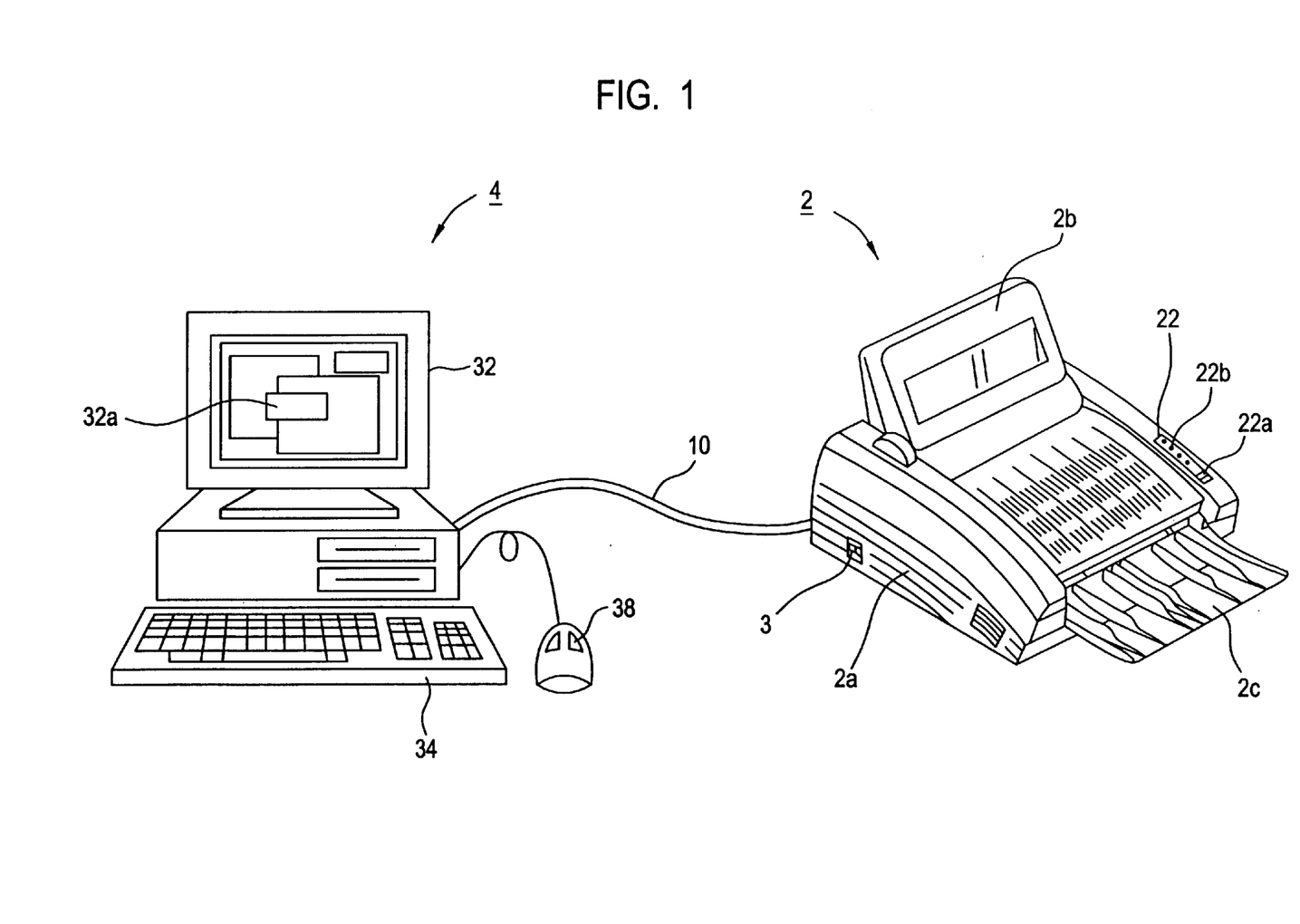
FIG. 1 is a schematic view showing a laser printer connected to a personal computer 4 in Example 1.
Figure 2:
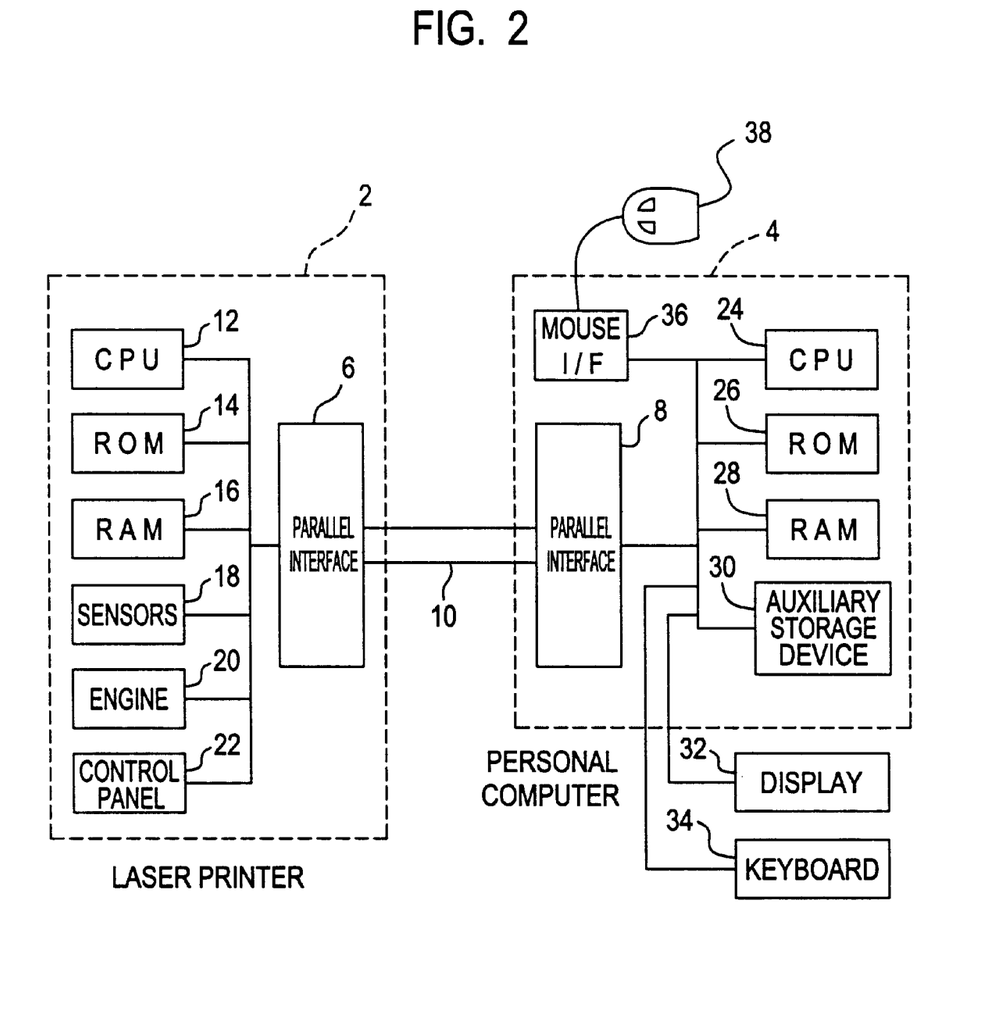
FIG. 2 is a block diagram of the same.

FIG. 1 shows a laser printer 2 connected to a personal computer (PC) 4 as the embodiment of the invention in Example 1. FIG. 2 shows the same as a block diagram.

The laser printer 2 and the personal computer (PC) 4 are connected via parallel interfaces 6 and 8, which are compliant to a specific standard, in this case the IEEE 1284 standard described before, by a cable 10 for connecting the IEEE 1284 complied with interfaces.

Aside from the parallel interface 6, the laser printer 2 comprises a CPU 12 performing different control routines according to a program, a ROM 14 storing different control programs, a RAM 16 providing the working area for the operations of the CPU 12, and storing the computational results of the same CPU 12 and different setting conditions, different types of sensors 18, including a paper feed sensor, a paper ejection sensor and a toner sensor, an engine 20 including the main motor, etc., for driving the mechanical parts of the laser printer 2, and a control unit 22 for displaying indicative control and states for setting specific states by LED lamp 22b and for giving simple instructions to the laser printer 2 by push button switch 22a. A power switch 3 is further provided on the side of the printer body 2a of the laser printer 2.

On the other hand, aside from the parallel interface 8, the personal computer (PC) 4 comprises a CPU 24 performing different control routines according to a program, a ROM 26 storing different control programs, a RAM 28 storing data, programs such as device drivers, application software or operating systems, read from the auxiliary storage medium in the auxiliary storage device 30, or the computational results of the CPU 24 and different setting conditions, the auxiliary storage device 30 accepting from the outside floppy disc, optical-magnetic disc or CD-ROM, etc., as an auxiliary storage medium a display 32 displaying the computational results, the menu or the status of the laser printer 2 side during printing, etc., a keyboard 34 receiving the input from the user, and a mouse input device 38 for inputting instructions and for moving the mouse cursor displayed on display 32 via the mouse interface 36.

In the laser printer 2, a sheet feeding unit 2b is provided on the top rear side of the printer body 2a; during printing, the printing paper inside the sheet feeding unit 2b is sent one page at a time to the image-forming unit inside the laser printer 2, where, after the toner image has been transferred, the toner is fixed on the printing paper in the fixing unit by applying heat, before the paper is ejected to a paper ejection tray 2c.

Figure 3:
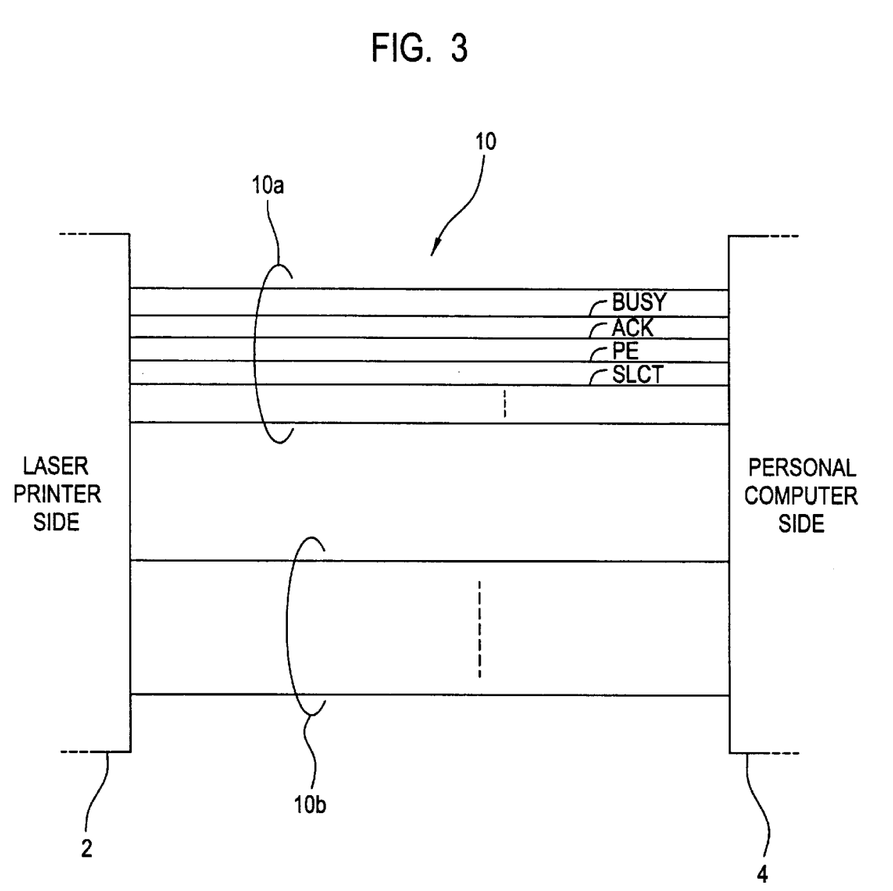
FIG. 3 is a block diagram of the cable connecting the laser printer to the personal computer.

Further, while the personal computer (PC) 4 and the laser printer 2 exchange handshake signals like strobe signal and acknowledge signal for the handshake procedure with each other over the control lines 10a shown in FIG. 3, data and commands are transmitted from the personal computer (PC) 4 over the data line 10b; according to the result of which the laser printer 2 will perform the printing operation, or if the laser printer 2 can perform in byte mode, which will be described hereafter, it will transmit status data to the personal computer (PC) 4 side. If the personal computer (PC) 4 receives the status data of the laser printer 2 during printing, the printer status will be displayed in the status monitor display field 32a of the display 32.

Figure 4A:
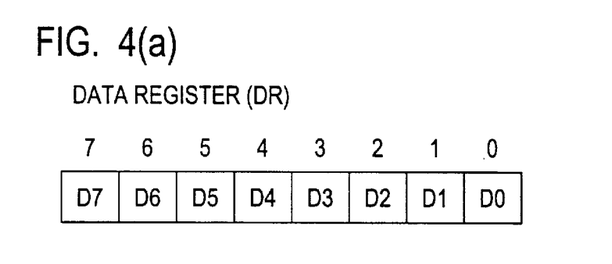
FIG. 4 is a diagram of the data register (DR), control register (CR), and status register (SR) provided at the interface of the personal computer.
Figure 4B:
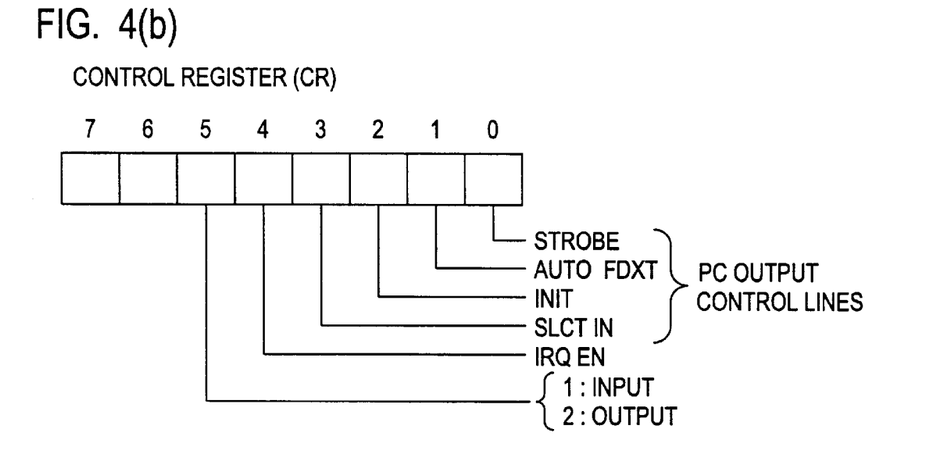

The three 8-bit registers shown in FIG. 4 (a), (b) and (c) are provided at the parallel interface 8 of the personal computer (PC) 4. If 8 bits (1 byte) of data are written to the data register (DR) shown in (a) when "0" is set to bit 5 of the control register (CR) shown in (b), these 8 bits of data are transmitted as parallel data over the data lines 10b of the IEEE 1284 compliant cable 10 to the laser printer 2 side.

Moreover, if 8 bits (1 byte) of data are read from the data register (DR) shown in FIG. 4 (a) when "1" is set to bit 5 of the control register (CR) shown in (b), data sent by reverse direction transmission from the laser printer 2 as parallel data over the data lines 10b of the IEEE 1284 compliant cable 10 can be read. Which means that, by setting "1" to bit 5 of the control register (CR), the personal computer (PC) 4 can set the byte mode, and can receive the status data and the ID data, etc., of the laser printer 2 over the data lines 10b from the laser printer 2.

Further, with personal computers not equipped with the byte mode function, i.e. with personal computers that cannot receive data from the laser printer 2 over the data lines 10b, the value of bit 5 of the control register (CR) does not have the meaning of "0" or of "1". Consequently, the data register (DR) shown in FIG. 4 (a) is used exclusively for transmitting data to the laser printer 2.

Figure 4C:
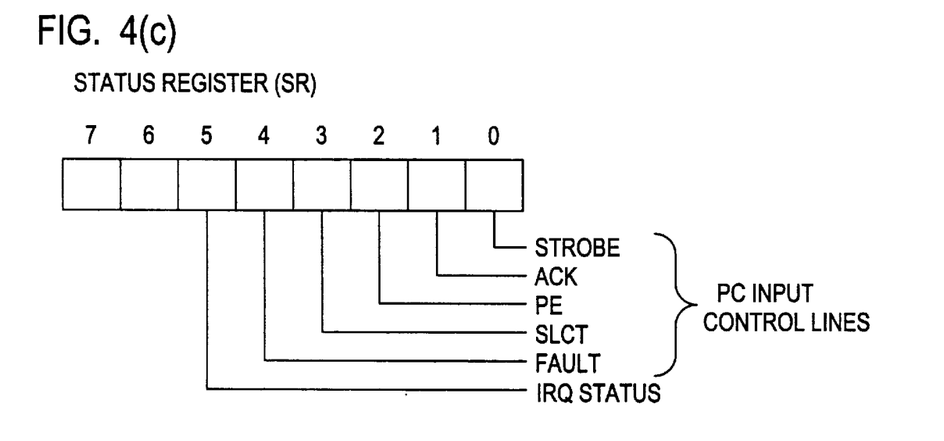

By setting the contents of bit 0 to bit 3 of the control register (CR) shown in FIG. 4 (b), the personal computer (PC) 4 can decide the control line output, which is output to the laser printer 2 side for the handshake procedure with the laser printer 2. Moreover, by reading the contents of bit 0 to bit 4 of the status register (SR) shown in FIG. 4 (c), the personal computer (PC) 4 can take control line output from the laser printer 2 side for the handshake procedure with the laser printer 2. Further, in the nibble mode described hereafter, bit 0 to bit 3 of this status register (SR) are handled as 4 bit of input data transmitted from the laser printer 2.

Figure 5:
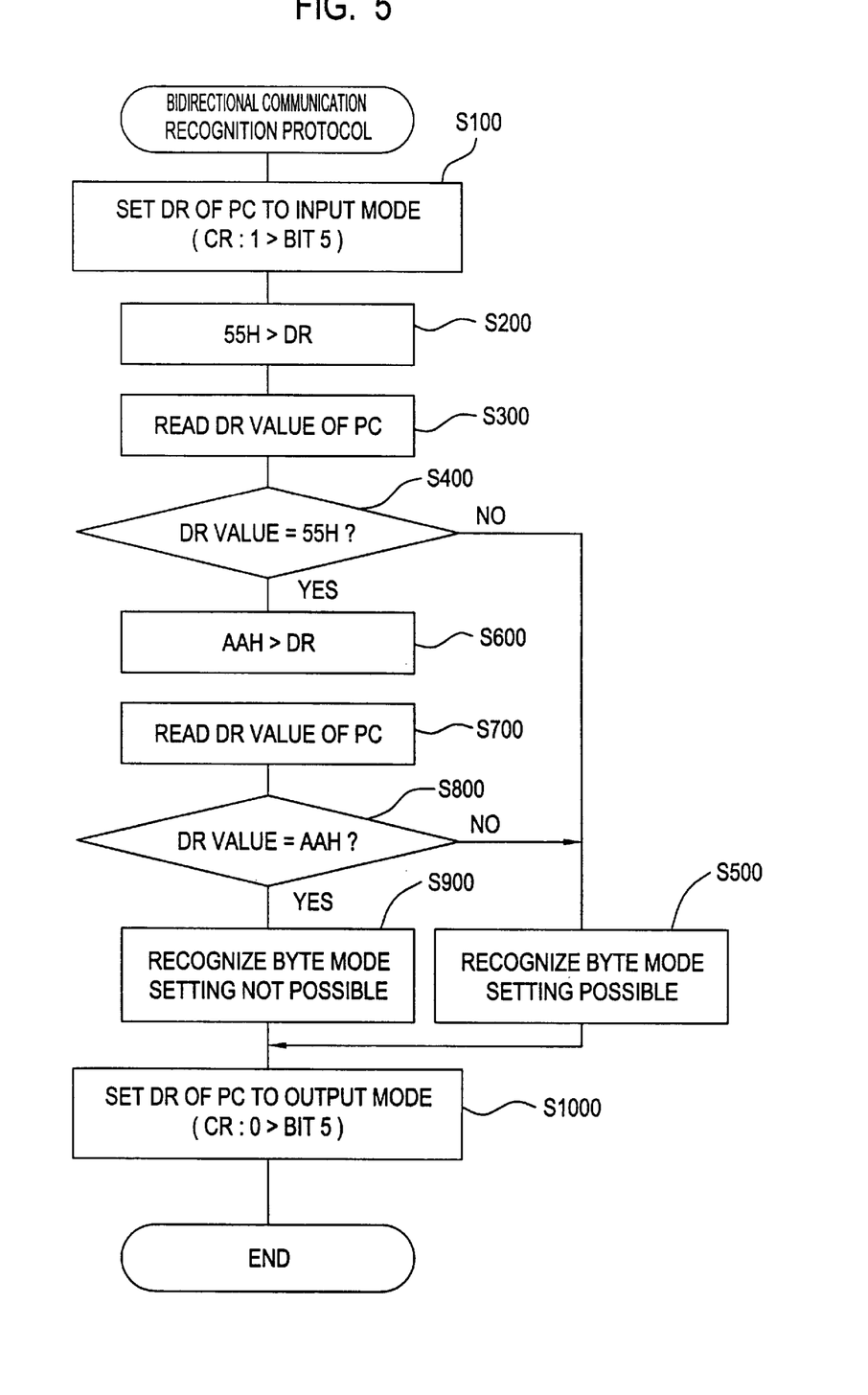
FIG. 5 is a flowchart of a bidirectional communication recognition protocol executed on the personal computer.

Next, the bidirectional communication recognition protocol, activated automatically by the operating system run on the personal computer (PC) 4, or activated by the instructions of the user on the personal computer (PC) 4, when first connecting the personal computer (PC) 4 to the laser printer 2 with the IEEE 1284 compliant cable 10, will be explained. FIG. 5 shows a flowchart of the bidirectional communication recognition protocol.

First, "1" is set to bit 5 of the control register (CR) provided at the parallel interface 8 of the personal computer (PC) 4, i.e. the setting for receiving output from the laser printer 2 over the data lines 10b in byte mode (S100).

This protocol sets the personal computer (PC) 4 to enable it to receive output from the laser printer 2 over the data lines 10b by reverse direction transmission in the case of a personal computer which is provided with the byte mode function, however, in the case of a personal computer which is not provided with the byte mode function, the setting for transmitting to the laser printer 2 remains unchanged.

Next, "55H" is written to the data register (DR) (S200) And then, the value of the data register (DR) is read (S300)

Next, it is determined whether or not the value read in step S300 is identical to the value "55H" written in step S200 (S400). If the read value of the data register (DR) is not "55H" ("NO" in S400), then it is recognized that the personal computer (PC) 4 can be set to byte mode (S500).

This recognition is implemented by a flag representing a recognition contents in the RAM 28 and by writing to a file for the initial setting of the auxiliary storage medium of the auxiliary storage device 30, etc.; if, in the printing process (not shown in the diagram) that takes place hereafter, it is recognized that "BYTE MODE SETTING POSSIBLE", then bidirectional communication is performed in byte mode, if it is recognized that "BYTE MODE SETTING NOT POSSIBLE", then bidirectional communication is performed in nibble mode. Based on the status data, etc., transmitted from the laser printer 2 side by means of this bidirectional communication, a detailed display, etc., of the laser printer 2 status is output to the status monitor display field 32a at the personal computer (PC) 4.

In this nibble mode, 1 byte of data is divided in 2 data transfer cycles of 4 bits each for transmission from the laser printer 2 to the personal computer (PC) 4 using 4 (status line) of the input control lines, e. g. the status lines "BUSY", "ACK", "PE" and "SLCT", of the control lines 10a reflected in each bit of the status register (SR) shown in FIG. 4 (c).

If the value of the data register (DR) is "55H" ("YES" in S400), then "AAH" is written to the data register (DR) (S600) Next, the value of the data register (DR) is read (S700), and it is determined whether or not the value is "AAH" (S800).

If the value of the data register (DR) is not "AAH" ("NO" in S800), then it is recognized that the personal computer (PC) 4 can be set to byte mode (S500).

If the value of the data register (DR) is "AAH" ("YES" in S800), then it is recognized that the personal computer (PC) 4 cannot be set to byte mode (S900), "0" is set to bit 5 of the control register (CR) (S1000), and the data register (DR) of the personal computer (PC) 4 is returned to output mode towards the laser printer 2.

In this way the personal computer (PC) 4 can recognize whether or not byte mode is possible. And since the personal computer (PC) 4 in Example 1 is capable of the byte mode, it is recognized that byte mode is possible (S500) after "NO" has been determined in at least one of the steps S400 and S800.

Next, the reason why it is recognized that the byte mode setting is possible (S500), if the contents written to the data register (DR) in step S200 has not been maintained at the same value ("NO" in S400), will be explained.

Figure 6:
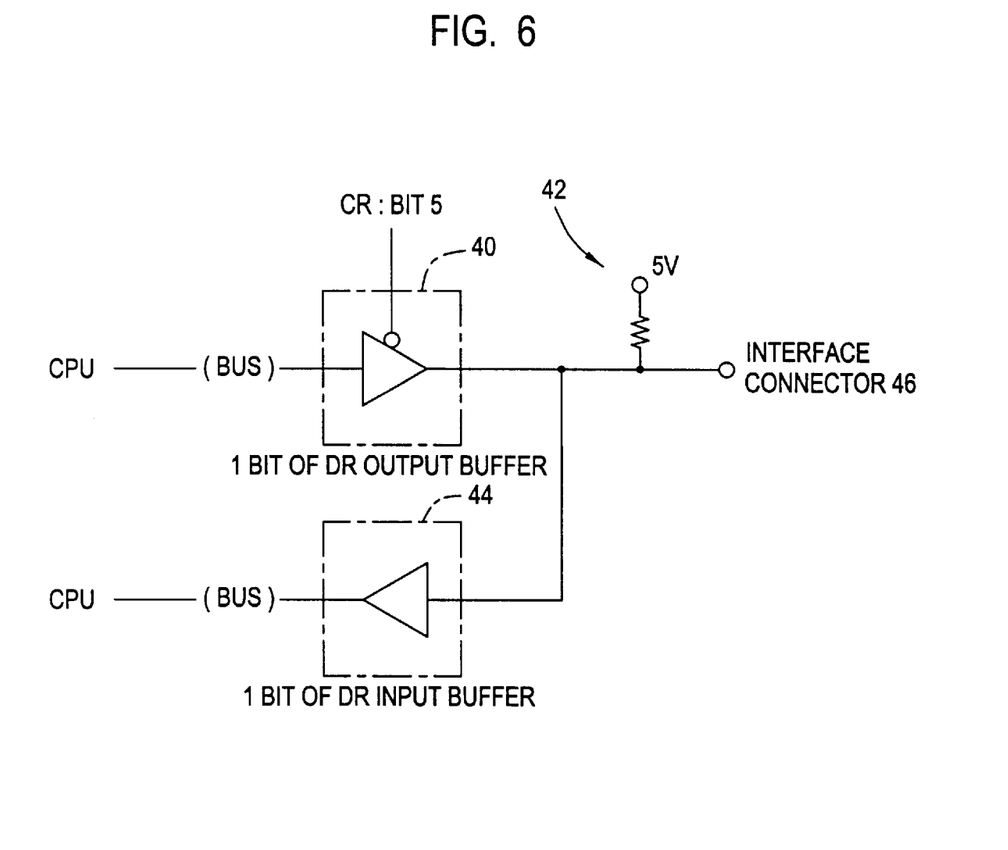
FIG. 6 is a circuit diagram of 1 bit of the data register (DR) of a personal computer supporting the byte mode.

As can be understood from the circuit diagram for 1 bit of the data register (DR) shown in FIG. 6, when bit 5 of the control register (CR) is "1", an output buffer 40 of the byte mode capable data register (DR) goes to a high impedance and the input buffer 44 of the data register (DR) is enabled to reflect the signal from an interface connector 46. At this point, if there is no transmission from the interface connector 46, i.e. the laser printer 2, all the bits of the data register (DR) are set to "1" by the pull-up circuit 42. Which means that, no matter what value was written to the data register (DR) in step S200, the data read from the data register (DR) is "FFH". Consequently, it can be recognized that the byte mode setting is possible, if, except for the value of "FFH", the contents written to the data register (DR) in step S200 is not maintained as it is.

In the case of a data register (DR) not capable of the byte mode, since bit 5 of the control register (CR) does not have any influence on the impedance of the output buffer 40, bit 5 can be "1" or it can be "0", the impedance remains low, and its value reflects a contents written by the CPU 24 via a bus on the personal computer (PC) 4 side to the output buffer 40. Consequently, the input buffer 44 of the data register (DR) reflects the contents of the output buffer 40 written in step S200 as it is. Which means that the value written to the data register (DR) in step S200 coincides with the value read from the data register (DR). Consequently, it can be recognized that the personal computer (PC) 4 cannot be set to the byte mode, if the contents written to data register (DR) in step S200 is maintained as it is.

Moreover, having confirmed that the contents written and the contents read in step S400 are identical, the value is changed one more time, after which it is determined whether or not the written contents and the read contents are identical (S600, S700 and S800). The reasons for this will be explained below.

For example, it is possible to imagine a case in which, if a value, except for "FFH", is read from the data register (DR), this read value coincides by chance with the value set to the data register (DR) in step S200, due to an effect of the status of the parallel interface 6 on the laser printer 2 side or some other reason. In such a case, even if the personal computer (PC) 4 is capable of the byte mode, it is determined that the byte mode is not possible since the written value and the read value are identical. Consequently, in order to avoid this, the value written to the data register (DR) is changed one more time to confirm if the byte mode is really not possible.

Further, in case the personal computer 4 is not capable of the byte mode, the parallel interface 8 of the personal computer 4 remains in transmission mode even if "1" has been set to bit 5 of the control register (CR) in step S100; however, since the personal computer 4 side does not request the transmission of the status, the ID and other data from the laser printer 2 in the bidirectional communication recognition protocol of FIG. 5, the laser printer 2 does not start a transmission to the parallel interface 8 of the personal computer 4, which remains in the transmitting state, and there is no danger of malfunctioning as before even when performing automatic recognition.

In Example 1, the personal computer 4 corresponds to the first device, the laser printer 2 corresponds to the second device, step S100 corresponds to the process of the reverse direction transmission setting means, steps S200, S300, S600 and S700 correspond to the process of the data register write/read means, steps S400 and S800 correspond to the process of the comparing means, and steps S500 and S900 correspond to the process of the recognition means.

EXAMPLE 2

Figure 7:
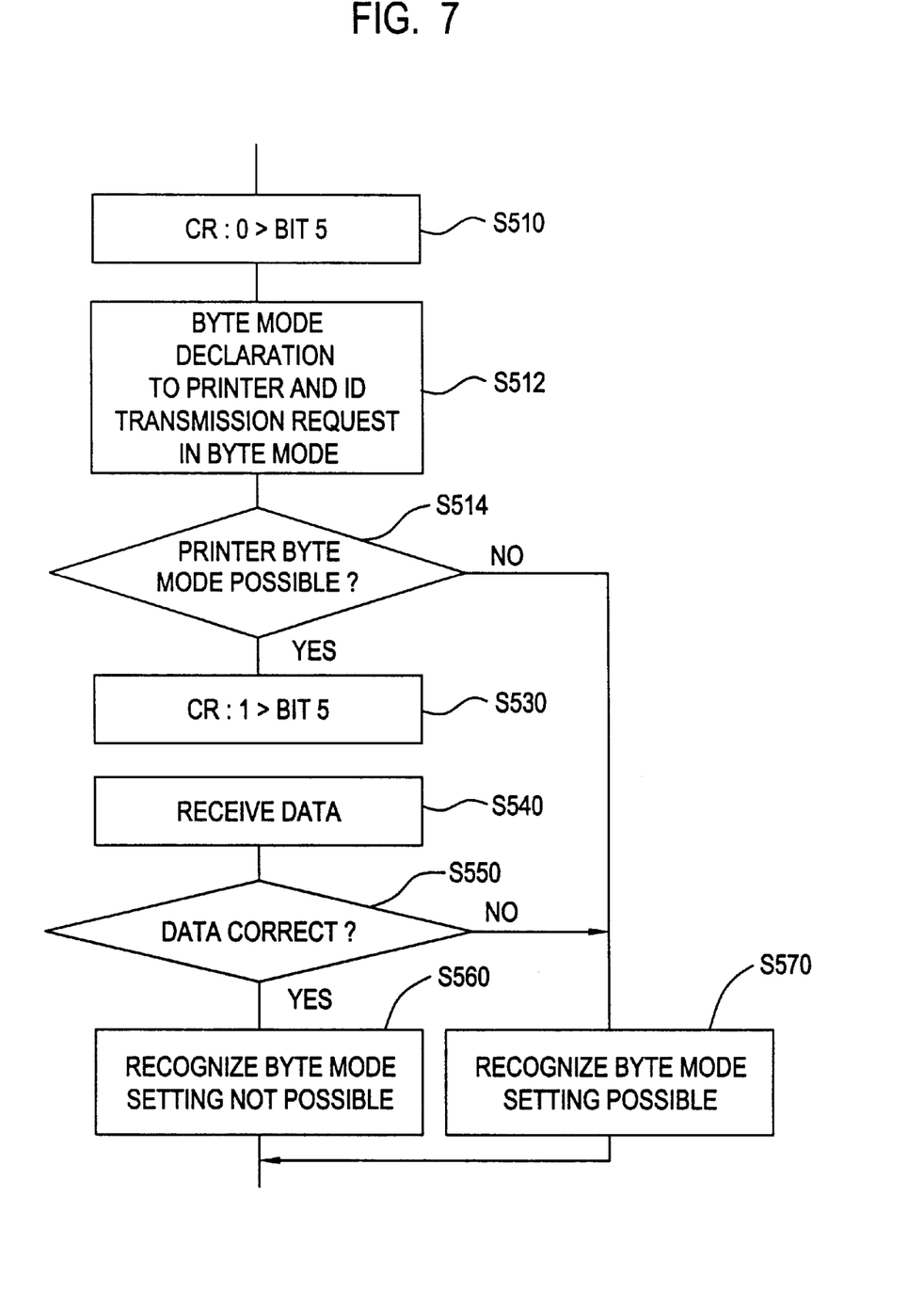
FIG. 7 is a flowchart showing part of the bidirectional communication recognition protocol for Example 2.

Secondly, considering a case in which it is uncertain whether or not the laser printer 2 is capable of the byte mode, or whether or not a switchbox or other device connected to the IEEE 1284 compliant cable 10 supports the byte mode, it is not immediately recognized in step S500 of FIG. 5 that the byte mode setting is possible, but instead the routine shown in FIG. 7 can further be executed.

Which means that, if "NO" has been determined in step S400 or in step S800, then "0," is set to bit 5 of the control register (CR) for outputting commands to the laser printer 2 (S510). And then, a byte mode declaration is sent together with an ID transmission request in byte mode to the laser printer 2 (S512) The byte mode declaration and the ID request are transmitted via a command over the data lines 10*b* to the laser printer 2. Directly after the byte mode declaration and the ID request it is determined whether or not the laser printer 2 has sent a reply to the effect that byte mode is not possible by inverting the impedance of one of the control lines 10*a*, e.g. "SLCT" (S514). If a reply to the effect that byte mode is not possible has been returned ("NO" in S514), then it is recognized that the byte mode setting is not possible (S570).

If a reply to the effect that byte mode is not possible has not been returned ("YES" in S514), then "1" is set to bit 5 of the control register (CR) for receiving data from the laser printer 2 (S530), and the data transmitted in byte mode from the laser printer 2 over the data lines 10*b* is received (S540).

And then, it is determined whether or not the received data is correct (S550). Since the format of the data (an ID in this case) transmitted by the laser printer 2 is specified, it is possible to determine whether or not the data is correct by determining whether or not the data conforms to the specified format. Which means that the data received by the personal computer 4 from the laser printer 2 is determined to be "correct" if it accords with the specified format, and is determined to be "not correct" if it does not accord with the specified format. For example, since the format is specified so as to include in the ID an indication "MANUFACTURER:" for designating the name of the manufacturer, the data is correct ("YES" in S550) if the code string expressing this character string is included in the data transmitted from the laser printer 2, and it is then recognized that the byte mode setting is possible (S560). If no such code string is included, or if no data is transmitted, it is not correct ("NO" in S550), and is recognized that the byte mode setting is not possible (S570).

If the laser printer 2 supports the byte mode, and if the IEEE 1284 compliant cable 10, the switchbox, etc. also support the byte mode, bidirectional communication in byte mode with the personal computer 4 is possible; in such a case, if there is no reply to the effect that the byte mode is not possible from the control lines 10*a* ("YES" in S514), the data from the laser printer 2 is correctly received at the personal computer 4 ("YES" in S550), and it is correctly recognized that the byte mode setting is possible (S560).

If the laser printer 2 does not support the byte mode, or if the switchbox, etc. do not support the byte mode, bidirectional communication in byte mode with the personal computer 4 is not possible. Consequently, in such a case, because a reply to the effect that byte mode is not possible is returned from the control lines 10*a* ("NO" in S514), or because no data is received from the data lines 10*b*, or because incorrect data which does not conform to the format is received ("NO" in S550), it is correctly recognized that the byte mode setting is not possible (S570).

Moreover, the decision of whether data is correct or not correct, by thus sending data from the laser printer 2, has already been made in step S400 or step S800 for the case of a personal computer 4 which supports the byte mode; therefore, in the case of personal a computer 4 which does not support the byte mode, there is no danger of malfunctioning caused by a transmission in byte mode from the laser printer 2 as before.

In Example 2, steps S510 and S512 correspond to the process of the data transmission request means, step S514 corresponds to the process of the reply detecting means, steps S530, S540 and S550 correspond to the process of the data status detecting means, and steps S560 and S570 correspond to the process of the recognition means.

Other Examples

Further, in the Examples described before, the data line reverse direction transmission for transmitting data from the laser printer 2 to the personal computer 4 over the parallel data lines 10b has been implemented with the byte mode setting; however, other than with the byte mode, such a data line reverse direction transmission can also be implemented with the ECP (enhanced capabilities port) method or with the EPP (enhanced parallel port) method, both of which have different handshake procedures than the byte mode.

Moreover, when it is recognized that byte mode is not possible, data from the laser printer 2 to the personal computer 4 is transmitted in the nibble mode by dividing it into 2 times 4 bit; however, instead of using the nibble mode, it is also possible to disable the transmission of data from the laser printer 2 to the personal computer 4 over the control lines 10a. Which means that a command can be transmitted from the personal computer 4 to the laser printer 2 to disable the nibble mode.

Moreover, in the Examples described before, when it is recognized that byte mode is not possible, a setting for transmitting data from the laser printer 2 to the personal computer 4 in the nibble mode is implemented; however, instead of immediately setting the nibble mode, it is also possible to set the nibble mode after having recognized whether or not the laser printer 2 is capable of the nibble mode by a method practically identical to the routine in FIG. 7, as will be explained hereafter.

Namely, the personal computer 4 sends a nibble mode declaration and an ID transmission request to the laser printer 2 over the data lines 10b (this corresponds to the process of the second data transmission request means). Directly after the nibble mode declaration and the ID request it is determined whether or not the laser printer 2 has sent a reply to the effect that nibble mode is not possible by inverting the impedance of one of the control lines 10a, e. g. "SLCT" (this corresponds to the process of the second reply detecting means); and if a reply to the effect that nibble mode is not possible has been returned, then it is recognized that the nibble mode setting is not possible (this corresponds to the process of the second recognition means). Further, if a reply to the effect that nibble mode is not possible has not been returned, the personal computer 4 receives the ID in nibble mode and checks its contents (this corresponds to the process of the second data status detecting means), and if the received data is not correct because no ID was received, or because the content of the ID was not correct, then it is recognized that the nibble mode setting is not possible (this corresponds to the process of the second recognition means), but if a correct ID has been received, then it is recognized that the nibble mode setting is possible (this corresponds to the process of the second recognition means) And if it is recognized that the nibble mode setting is possible, then the data from the laser printer 2 is received in nibble mode; however, if it is recognized that the nibble mode setting is not possible, then the personal computer 4, receiving data from the laser printer 2 in neither the byte mode nor the nibble mode, is set to unidirectional communication (this corresponds to the process of the second recognition means).

Further, the process in which the personal computer 4 declares the nibble mode to the laser printer 2 over the data lines 10b corresponds to the process of the second notifying means.

What is claimed is:

1. A bidirectional communication recognition method for a first device in a communication system for transmitting data in a forward direction from the first device to a second device over parallel data lines of a parallel interface, and transmitting data in a reverse direction from the second device to the first device over the parallel data lines, the method comprising:

writing specific data to a data register provided in the first device, which outputs data written during forward direction transmission as parallel signals to the parallel data lines, reading contents of the data register, and comparing the written specific data with the read contents to determine whether the read contents and the written data are different, if the read contents and the written data are determined to be different, recognizing that bidirectional communication of the first device and the second device at a predetermined system over the parallel data lines is possible without operator intervention, if the read contents and the written data are determined to be identical recognizing that the bidirectional communication is not possible without operator intervention, and when the read contents and the written data are determined to be different, sending a data transmission request and a notification indicating that data line reverse direction transmission is possible from said first device to said second device.

2. The bidirectional communication recognition method according to claim 1, said first device comprising a computer system and said second device comprising a printer.

3. The bidirectional communication recognition method according to claim 1, further comprising:

constantly changing a content of said specific data until the read contents and the written data are determined to be different, the writing of said specific data and the reading of the contents of the data register being performed repeatedly a specific number of times as an upper limit, and if after the writing of the specific data and the reading of the contents of the data register are performed repeatedly the specific number of times and the read contents and the written data are not determined to be different, recognizing that the bidirectional communication is not possible.

4. The bidirectional communication recognition method according to claim 1, further comprising:

when the read contents and the written data are determined to be different, sending a notification indicating that data line reverse direction transmission is possible from said first device to said second device, if a signal indicating that the data line reverse direction transmission is not possible is not returned from the second device over control lines of the parallel interface to the first device in response to the notification, recognizing that said bidirectional communication is possible, and if a signal indicating that the data line reverse direction transmission is not possible is returned from the second device over the control lines of the parallel interface to the first device in response to the notification, recognizing that the bidirectional communication is not possible.

5. The bidirectional communication recognition method according to claim 1, if data returned from the second device by the data line reverse direction transmission in response to the data transmission request is correct, recognizing that said bidirectional communication is possible, and if the return data is not correct, recognizing that the bidirectional communication is not possible.

6. The bidirectional communication recognition method according to claim 1, further comprising:

when the read contents and the written data are determined to be different, sending a data transmission request and a notification indicating that data line reverse direction transmission is possible from said first device to said second device, if a signal indicating that the data line reverse direction transmission is not possible is not returned from the second device over control lines to the first device in response to the notification, and if data returned by the data line reverse direction transmission from the second device in response to the data transmission request is correct, recognizing that the bidirectional communication is possible, and if a signal indicating that the data line reverse direction transmission is not possible is returned from the second device over the control lines to the first device in response to the notification, or if the data returned by the data line reverse direction transmission from the second device in response to the data transmission request is not correct, recognizing that the bidirectional communication is not possible.

7. The bidirectional communication recognition method according to claim 6, further comprising, if said bidirectional communication is recognized not to be possible, recognizing that, for parallel reverse direction transmission of data from the second device to the first device, only control line reverse direction transmission using a plurality of control lines in parallel is possible.

8. The bidirectional communication recognition method according to claim 7, further comprising:

if said bidirectional communication is recognized to be possible, setting said first device to perform bidirectional communication, and if said bidirectional communication is recognized not to be possible, setting the first device to perform bidirectional communication comprising forward direction communication and said control line reverse direction transmission using a plurality of control lines in parallel.

9. The bidirectional communication recognition method according to claim 1, further comprising:

when said bidirectional communication is determined not to be possible, sending a notification indicating that control line reverse direction transmission using a plurality of control lines in parallel is possible from said first device to said second device, and wherein, if a signal indicating that the control line reverse direction transmission is not possible is not returned from the second device to the first device over control lines of the parallel interface in response to the notification that the control line reverse direction transmission is possible, recognizing that the control line reverse direction transmission is possible, and if a signal indicating that the control line reverse direction transmission is not possible is returned from the second device to the first device over the control lines in response to the notification that control line reverse direction transmission is possible, recognizing that the control line reverse direction transmission is not possible.

10. The bidirectional communication recognition method according to claim 1, further comprising:

when said bidirectional communication is determined not to be possible, sending a notification indicating that control line reverse direction transmission using a plurality of control lines in parallel is possible and a data transmission request from the first device to the second device, if data returned in response to the data transmission request from the second device by control line reverse direction transmission is correct, recognizing that the control line reverse direction transmission is possible, and if the returned data is not correct, recognizing that the control line reverse direction transmission is not possible.

11. The bidirectional communication recognition method according to claim 1, further comprising:

when said bidirectional communication is determined not to be possible, sending a notification indicating that control line reverse direction transmission using a plurality of control lines in parallel is possible and a data transmission request from the first device to the second device, if a signal indicating that the control line reverse direction transmission is not possible is not returned from the second device to the first device over the control lines in response to the notification, and if data returned in response to the data transmission request from the second device by the control line reverse direction transmission is correct, recognizing that the control line reverse direction transmission is possible, and if a signal indicating that the control line reverse direction transmission is not possible is returned from the second device to the first device over the control lines in response to the notification, or if the data returned in response to the data transmission request from the second device by control line reverse direction transmission is not correct, recognizing that the control line reverse direction transmission is not possible.

12. The bidirectional communication recognition method according to claim 11, further comprising:

if said control line reverse direction transmission is recognized not to be possible, recognizing that parallel reverse direction transmission of data from the second device to the first device is not possible.

13. The bidirectional communication recognition method according to claim 12, further comprising:

if said control line reverse direction transmission is recognized to be possible, setting said first device to perform the control line reverse direction transmission, and if the control line reverse direction transmission is recognized not possible, setting the first device to perform neither said bidirectional communication nor the control line reverse direction transmission.

14. The bidirectional communication recognition method according to claim 13, said first device and said second device independently comprising a byte mode or a nibble mode.

15. A bidirectional communication recognition device in a communication system for transmitting data in a forward direction from a first device to a second device over parallel data lines of a parallel interface, writing data to a data register provided at the first device, and outputting the data as parallel signals to the parallel data lines, the bidirectional communication recognition device comprising:

reverse direction transmission setting means that sets a data line reverse direction transmission for transmitting data from the second device to the first device over the parallel data lines, data register write/read means that writes specific data to the data register and reads contents of the data register after the data line reverse direction transmission has been set by the reverse direction transmission setting means, comparing means that compares two values including a value of specific data written by the data register write/read and a value of the contents read by the data register write/read means, and determines whether or not the two values are identical, recognition means that recognizes that bidirectional communication over the parallel data lines between the first device and the second device is possible if the comparing means determines that the two values are different without operator intervention, and recognizes that the bidirectional communication over the parallel data lines between the first device and the second device is not possible if the comparing means determines that the two values are identical without operator intervention and notifying means that sends a notification indicating that data line reverse direction transmission is possible from said first device to said second device when said comparing means determines that the data line reverse direction transmission is not possible has been returned from the second device over control lines of the parallel interface.

16. The bidirectional communication recognition device according to claim 15, said bidirectional communication recognition device being provided in the first device.

17. The bidirectional communication recognition device according to claim 15, said first device comprising a computer system and said second device comprising a printer.

18. The bidirectional communication recognition device according to claim 15, said comparing means causing said data register write/read means to repeatedly change a content of the specific data, write the specific data and read the contents of the data register a specified number of times as an upper limit until the two values are determined to be different, and said recognition means recognizing that said bidirectional communication is possible if the comparing means determines that said two values are different, or that said bidirectional communication is not possible if the comparing means cannot determine that the two values are different even after the data register write/read means has written the specific data and read the contents of the data register the specified number of times.

19. The bidirectional communication recognition device according to claim 15, said recognition means recognizing that the bidirectional communication is possible if a reply indicating that the data line reverse direction transmission is not possible has not been detected by reply detecting means when the comparing means determines that the two values are different, or that the bidirectional communication is not possible if a reply indicating that the data line reverse direction transmission is not possible has been detected by the reply detecting means.

20. The bidirectional communication recognition device according to claim 15, further comprising:

data transmission request means that sends a notification indicating that data line reverse direction transmission is possible and a data transmission request from said first device to said second device when said comparing means determines that said two values are different, and data status detecting means that detects whether or not data returned in response to the data transmission request by the data transmission request means from the second device by said data line reverse direction transmission is correct, said recognition means recognizing that the bidirectional communication is possible if the data status detecting means detects that data returned by the data line reverse direction transmission is correct when the comparing means determines that the two values are different, or that the bidirectional communication is not possible if the data status detecting means detects that the data returned is not correct.

21. The bidirectional communication recognition device according to claim 15, further comprising:

data transmission request means that sends a notification indicating that data line reverse direction transmission is possible and a data transmission request from said first device to said second device when said comparing means determines that said two values are different, reply detecting means that detects whether or not, in response to the notification of the data transmission request means, a signal indicating that the data line reverse direction transmission is not possible has been returned from the second device over control lines, and data status detecting means that detects whether or not data returned, in response to the data transmission request by the data transmission request means, from the second device by the data line reverse direction transmission is correct, said recognition means 1) recognizing that the bidirectional communication is possible, if a reply indicating that the data line reverse direction transmission is not possible has not been detected by reply detecting means, and if the data status detecting means detects that the data returned by data line reverse direction transmission is correct when the comparing means detects that the two values are different, or 2) recognizing that the bidirectional communication is not possible if a reply indicating that the data line reverse direction transmission is not possible has been detected by the reply detecting means or if the data status detecting means detects that the data returned by the data line reverse direction transmission is not correct.

22. The bidirectional communication recognition device according to claim 21, if said recognition means recognizes that said bidirectional communication is not possible, said recognition means recognizing that for parallel reverse direction transmission of data from said second device to said first device, only control line reverse direction transmission using a plurality of control lines in parallel is possible.

23. The bidirectional communication recognition device according to claim 22, if said recognition means recognizes that said bidirectional communication is not possible, said recognition means setting said first device to perform the bidirectional communication, and if said recognition means recognizes that the bidirectional communication is not possible, said recognition means setting the first device to perform the bidirectional communication comprising forward direction communication and said control line reverse direction transmission using the plurality of control lines in parallel.

24. The bidirectional communication recognition device according to claim 21, the recognition means comprising a first recognition means, the device further comprising:

second notifying means that sends a notification indicating that control line reverse direction transmission using a plurality of control lines in parallel is possible from said first device to said second device when said first recognition means recognizes that said bidirectional communication is not possible, second reply detecting means that detects whether or not, in response to the notification by the second notifying means, a signal indicating that control line reverse direction transmission is not possible has been returned from the second device over said control lines of the parallel interface, and second recognition means that recognizes that control line reverse direction transmission is possible if a reply indicating that control line reverse direction transmission is not possible has not been detected by second reply detecting means, and that recognizes that the control line reverse direction transmission is not possible if a reply indicating that the control line reverse direction transmission is not possible has been detected by the second reply detecting means when the first recognition means recognizes that bidirectional communication is not possible.

25. The bidirectional communication recognition device according to claim 21, the recognition means comprising a first recognition means, the device further comprising:

second data transmission request means that sends a notification indicating that control line reverse direction transmission using a plurality of control lines in parallel is possible and a data transmission request from said first device to said second device when said first recognition means recognizes that said bidirectional communication is not possible, second data status detecting means that detects whether or not data returned in response to the data transmission request by the second data transmission request means from the second device by said control line reverse direction transmission is correct, and second recognition means that recognizes that the control line reverse direction transmission is possible if the second data status detecting means detects that the data returned by the control line reverse direction transmission is correct, or that recognizes that the control line reverse direction transmission is not possible if the second data status detecting means detects that the returned data is not correct when the first recognition means recognizes that the bidirectional communication is not possible.

26. The bidirectional communication recognition device according to claim 21, the recognition means comprising a first recognition means, the device further comprising:

second data transmission request means that sends a notification indicating that control line reverse direction transmission using a plurality of lines in parallel is possible and a data transmission request from said first device to said second device when said first recognition means recognizes that said bidirectional communication is not possible, second reply detecting means that detects whether or not, in response to the notification by the second data transmission request means, a signal indicating that the control line reverse direction transmission is not possible has been returned from the second device over control lines of the parallel interface, second data status detecting means that detects whether or not data returned in response to the data transmission request by the second data transmission request means from the second device by the control line reverse direction transmission is correct, and second recognition means that recognizes that the control line reverse direction transmission is possible if a reply indicating that the control line reverse direction transmission is not possible has not been detected by second reply detecting means, and that recognizes that the control line reverse direction transmission is not possible if the second data status detecting means detects that data returned by the control line reverse direction transmission is correct when the first recognition means recognizes that the bidirectional communication is not possible, or that recognizes that the control line reverse direction transmission is not possible if a reply indicating that the control line reverse direction transmission is not possible has been detected by second reply detecting means or if the second data status detecting means detects that the data returned by control line reverse direction transmission is not correct.

27. The bidirectional communication recognition device according to claim 26, if said second recognition means recognizes that said control line reverse direction transmission is not possible, said second recognition means recognizing that parallel reverse direction transmission of data from said second device to said first device is not possible.

28. The bidirectional communication recognition device according to claim 26, if said second recognition means recognizes that said control line reverse direction transmission is possible, said second recognition means setting said first device top perform the control line reverse direction transmission, and if said second recognition means recognizes that the control line reverse direction transmission is not possible, said second recognition means setting said first device to perform neither the bidirectional communication nor the control line reverse direction transmission.

29. The bidirectional communication recognition device according to claim 28, said first device and said second device independently comprising a byte mode or a nibble mode.

30. A storage medium for storing a program implementing the bidirectional communication method according to claim 1, said program being implemented at said first device as a computer system.

31. The storage medium according to claim 30, the second device comprising a printer.

* * * * *